(12) United States Patent
Fyfe

(10) Patent No.: US 11,465,002 B2
(45) Date of Patent: *Oct. 11, 2022

(54) SYSTEMS AND METHODS FOR FIREPROOFING CABLES AND OTHER STRUCTURAL MEMBERS

(71) Applicant: Dymat Construction Products, Inc., Solana Beach, CA (US)

(72) Inventor: Edward Robert Fyfe, Del Mar, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/543,306

(22) Filed: Aug. 16, 2019

(65) Prior Publication Data

US 2020/0215365 A1 Jul. 9, 2020

Related U.S. Application Data

(63) Continuation of application No. 15/699,928, filed on Sep. 8, 2017, now Pat. No. 10,512,803, which is a
(Continued)

(51) Int. Cl.
*A62C 2/06* (2006.01)
*B32B 5/02* (2006.01)
(Continued)

(52) U.S. Cl.
CPC ............. *A62C 2/06* (2013.01); *B32B 5/02* (2013.01); *B32B 5/06* (2013.01); *B32B 5/18* (2013.01);
(Continued)

(58) Field of Classification Search
CPC .. A62C 2/06; H01B 7/292; B32B 1/08; B32B 1/09; B32B 2250/44; B32B 2262/101;
(Continued)

(56) References Cited

U.S. PATENT DOCUMENTS 2,312,993 A  3/1943 Stephens
3,340,115 A  9/1967 Rubenstein
(Continued)

FOREIGN PATENT DOCUMENTS

CN    101949481    1/2011
CN    202871380    4/2013
(Continued)

OTHER PUBLICATIONS

U.S. Appl. No. 14/850,838, filed Sep. 10, 2015, Systems and Methods for Fireproofing Cables and Other Structural Members.
(Continued)

*Primary Examiner* — Camie S Thompson
(74) *Attorney, Agent, or Firm* — Knobbe, Martens, Olson & Bear, LLP

(57) ABSTRACT

According to some embodiments, a fireproofing system for protecting an elongate member, comprising at least one inner layer configured to at least partially wrap around itself to form an inner passage, the at least one inner layer configured to generally resist heat, and an outer shell or member defining an interior opening, wherein the first layer is configured to be positioned within the interior opening of the outer shell or outer member, wherein an elongate member is configured to pass through the inner passage.

20 Claims, 5 Drawing Sheets

Related U.S. Application Data continuation of application No. 14/850,838, filed on Sep. 10, 2015, now Pat. No. 9,757,599.

(60) Provisional application No. 62/048,777, filed on Sep. 10, 2014.

(51) Int. Cl.

| | | |
|---|---|---|
| *B32B 5/18* | (2006.01) | |
| *B32B 9/00* | (2006.01) | |
| *B32B 9/04* | (2006.01) | |
| *B32B 27/32* | (2006.01) | |
| *B32B 5/06* | (2006.01) | |
| *B32B 5/22* | (2006.01) | |
| *B32B 5/24* | (2006.01) | |
| *B32B 5/26* | (2006.01) | |
| *B32B 7/12* | (2006.01) | |
| *B32B 15/04* | (2006.01) | |
| *B32B 15/08* | (2006.01) | |
| *B32B 15/18* | (2006.01) | |
| *B32B 27/06* | (2006.01) | |
| *B32B 27/12* | (2006.01) | |
| *B32B 27/28* | (2006.01) | |
| *H01B 7/29* | (2006.01) | |
| *B32B 1/08* | (2006.01) | |

(52) U.S. Cl.
CPC .............. *B32B 5/22* (2013.01); *B32B 5/24* (2013.01); *B32B 5/245* (2013.01); *B32B 5/26* (2013.01); *B32B 7/12* (2013.01); *B32B 9/005* (2013.01); *B32B 9/007* (2013.01); *B32B 9/04* (2013.01); *B32B 9/046* (2013.01); *B32B 9/047* (2013.01); *B32B 15/04* (2013.01); *B32B 15/046* (2013.01); *B32B 15/08* (2013.01); *B32B 15/18* (2013.01); *B32B 27/065* (2013.01); *B32B 27/12* (2013.01); *B32B 27/283* (2013.01); *B32B 27/32* (2013.01); *H01B 7/292* (2013.01); *B32B 1/08* (2013.01); *B32B 9/045* (2013.01); *B32B 2250/44* (2013.01); *B32B 2255/00* (2013.01); *B32B 2255/02* (2013.01); *B32B 2262/10* (2013.01); *B32B 2262/101* (2013.01); *B32B 2262/105* (2013.01); *B32B 2262/106* (2013.01); *B32B 2266/04* (2013.01); *B32B 2266/057* (2016.11); *B32B 2307/306* (2013.01); *B32B 2307/3065* (2013.01); *B32B 2307/554* (2013.01); *B32B 2457/00* (2013.01); *B32B 2597/00* (2013.01)

(58) Field of Classification Search
CPC ........ B32B 2262/105; B32B 2262/106; B32B 2307/306; B32B 2307/3065; B32B 2597/00; B32B 2255/00; B32B 5/24; B32B 5/245; B32B 5/02; B32B 5/18; B32B 5/22; B32B 9/005; B32B 9/047; B32B 9/007; B32B 9/04; B32B 7/00; B32B 7/10; F01N 13/148; F01N 13/16; F01N 13/18; F02B 77/11; H02G 3/0412; H02G 3/0462; F16L 57/04; F16L 59/029; F16L 59/145; E04B 1/944; Y10T 442/60; Y10T 442/494
USPC .............. 428/34.1–36.92, 920; 442/60, 378; 405/157, 216
See application file for complete search history.

(56) References Cited

U.S. PATENT DOCUMENTS

| | | |
|---|---|---|
| 3,424,203 A | 1/1969 | Rubenstein |
| 3,950,465 A | 4/1976 | Farahar |
| 3,951,562 A | 4/1976 | Fyfe |
| 3,958,607 A | 5/1976 | Gray |
| 3,996,967 A | 12/1976 | Takada |
| 4,009,063 A | 2/1977 | Wood |
| 4,111,584 A | 9/1978 | Fyfe |
| 4,170,248 A | 10/1979 | Bennett et al. |
| 4,329,937 A | 5/1982 | Holland |
| 4,529,008 A | 7/1985 | Appleton |
| 4,605,106 A | 8/1986 | Fyfe et al. |
| 4,617,769 A | 10/1986 | Fyfe et al. |
| 4,676,276 A | 6/1987 | Fawley |
| 4,684,556 A | 8/1987 | Ohtsuga et al. |
| 4,830,179 A | 5/1989 | Fyfe |
| 4,877,665 A | 10/1989 | Higuchi et al. |
| 4,903,820 A | 2/1990 | Fyfe |
| 4,938,627 A | 7/1990 | Lee |
| 5,014,474 A | 5/1991 | Fyfe et al. |
| 5,030,493 A | 7/1991 | Rich |
| 5,035,539 A | 7/1991 | Kawafuji et al. |
| 5,043,033 A | 8/1991 | Fyfe |
| 5,077,107 A | 12/1991 | Kaneda et al. |
| 5,101,863 A | 4/1992 | Fujii et al. |
| 5,145,281 A | 9/1992 | Molyneux |
| 5,218,810 A | 6/1993 | Isley, Jr. |
| 5,271,433 A | 12/1993 | Schwert et al. |
| 5,280,811 A | 1/1994 | Catallo et al. |
| 5,348,801 A | 9/1994 | Venzi et al. |
| 5,388,929 A | 2/1995 | Molyneux |
| 5,395,472 A | 3/1995 | Mandich |
| 5,447,593 A | 9/1995 | Tanaka et al. |
| 5,451,351 A | 9/1995 | Blackmore |
| 5,580,406 A | 12/1996 | O'ffill |
| 5,597,240 A | 1/1997 | Fyfe |
| 5,606,997 A | 3/1997 | Blackmore et al. |
| 5,607,527 A | 3/1997 | Isley, Jr. |
| 5,649,398 A | 7/1997 | Isley, Jr. et al. |
| 5,657,595 A | 8/1997 | Fyfe et al. |
| 5,762,450 A | 6/1998 | Schmager |
| 5,791,378 A | 8/1998 | Stephens |
| 5,855,676 A | 1/1999 | Lu et al. |
| 5,915,886 A | 6/1999 | McNeil |
| 5,925,579 A | 7/1999 | Neuner et al. |
| 5,931,198 A | 8/1999 | Raji et al. |
| 5,985,385 A * | 11/1999 | Gottfried .................. B32B 1/08 405/157 |
| 6,021,815 A | 2/2000 | Kiest, Jr. et al. |
| 6,105,619 A | 8/2000 | Kiest, Jr. |
| 6,138,420 A | 10/2000 | Fyfe |
| 6,161,588 A | 12/2000 | Bellamy et al. |
| 6,167,913 B1 | 1/2001 | Wood et al. |
| 6,219,991 B1 | 4/2001 | Salek-Nejad |
| 6,295,782 B1 | 10/2001 | Fyfe |
| 6,416,692 B1 | 7/2002 | Iwasaki-Higbee |
| 6,602,025 B2 | 8/2003 | Markusch et al. |
| 6,659,362 B1 | 12/2003 | Hallissy et al. |
| 6,703,091 B1 | 3/2004 | Walker |
| 6,806,212 B2 | 10/2004 | Fyfe |
| 6,878,323 B2 | 4/2005 | Fyfe |
| 7,191,801 B2 | 3/2007 | Renteria |
| 7,207,149 B2 | 4/2007 | Fyfe et al. |
| 7,216,674 B2 | 5/2007 | Manners |
| 7,261,788 B2 | 8/2007 | Driver |
| 7,267,507 B2 | 9/2007 | Lecinq et al. |
| 7,270,150 B2 | 9/2007 | Warren |
| 7,300,229 B1 | 11/2007 | Fyfe et al. |
| 7,306,687 B2 | 12/2007 | Fyfe |
| 7,311,122 B2 | 12/2007 | Kamiyama et al. |
| 7,360,559 B2 | 4/2008 | Driver et al. |
| 7,406,806 B2 | 8/2008 | Hallissy |
| 7,574,840 B1 | 8/2009 | Fyfe |
| 7,930,863 B1 | 4/2011 | Fyfe |
| 7,946,088 B1 | 5/2011 | Fyfe et al. |
| 7,980,033 B1 | 7/2011 | Fyfe |

(56) References Cited

U.S. PATENT DOCUMENTS

| | | |
|---|---|---|
| 8,496,404 B1 | 7/2013 | Fyfe |
| 8,511,043 B2 | 8/2013 | Fyfe |
| 8,713,891 B2 | 5/2014 | Carr et al. |
| 8,784,006 B2 | 7/2014 | Fyfe |
| 8,795,832 B2 | 8/2014 | Fyfe et al. |
| 9,086,183 B2 | 7/2015 | Fyfe et al. |
| 9,133,814 B2 | 9/2015 | Fyfe |
| 9,757,599 B2 * | 9/2017 | Fyfe ................... B32B 5/02 |
| 10,512,803 B2 * | 12/2019 | Fyfe ................... B32B 15/04 |
| 2002/0098357 A1 | 7/2002 | Keogh |
| 2002/0122945 A1 | 9/2002 | Sanduja et al. |
| 2003/0178201 A1 | 9/2003 | Gleim et al. |
| 2003/0213556 A1 | 11/2003 | Blackmore et al. |
| 2004/0108009 A1 | 6/2004 | Kamiyama et al. |
| 2004/0176004 A1 | 9/2004 | Fyfe |
| 2004/0231740 A1 | 11/2004 | Stubler et al. |
| 2005/0028881 A1 | 2/2005 | Smith et al. |
| 2006/0070676 A1 | 4/2006 | Blackmore |
| 2006/0137755 A1 | 6/2006 | Renteria |
| 2007/0066165 A1 | 3/2007 | Fyfe |
| 2008/0155827 A1 | 7/2008 | Fyfe |
| 2009/0038702 A1 | 2/2009 | Fyfe et al. |
| 2009/0075051 A1 | 3/2009 | Fyfe |
| 2009/0211194 A1 | 8/2009 | Fyfe et al. |
| 2009/0314409 A1 | 12/2009 | Ehsani |
| 2010/0078118 A1 | 4/2010 | Ehsani |
| 2010/0212803 A1 | 8/2010 | Carr et al. |
| 2010/0218708 A1 | 9/2010 | Carr et al. |
| 2012/0047841 A1 | 3/2012 | Fyfe et al. |
| 2012/0058338 A1 | 3/2012 | Fyfe et al. |
| 2013/0062097 A1 | 3/2013 | Hammond et al. |
| 2013/0199715 A1 | 8/2013 | Fyfe et al. |
| 2014/0356529 A1 | 12/2014 | Goodell et al. |
| 2015/0056881 A1 * | 2/2015 | Zhang ................... F01N 13/148 442/268 |
| 2015/0323118 A1 | 11/2015 | Fyfe |
| 2015/0369399 A1 | 12/2015 | Fyfe |

FOREIGN PATENT DOCUMENTS

| | | |
|---|---|---|
| DE | 316445 | 8/1987 |
| DE | 4436280 | 4/1996 |
| EP | 0362929 | 4/1990 |
| EP | 0378232 | 7/1990 |
| EP | 0837201 | 4/1998 |
| GB | 1288284 | 9/1972 |
| GB | 2184512 | 6/1987 |
| JP | H08-180732 | 7/1996 |
| JP | 2003-259541 | 9/2003 |
| WO | WO 1994/005945 | 3/1994 |
| WO | WO 1998/009042 | 3/1998 |
| WO | WO 2003/014614 | 2/2003 |

OTHER PUBLICATIONS

U.S. Appl. No. 15/699,928, filed Sep. 8, 2017, Systems and Methods for Fireproofing Cables and Other Structural Members.

U.S. Appl. No. 16/543,306, filed Aug. 16, 2019, Systems and Methods for Fireproofing Cables and Other Structural Members.

* cited by examiner

SYSTEMS AND METHODS FOR FIREPROOFING CABLES AND OTHER STRUCTURAL MEMBERS

CROSS-REFERENCE TO RELATED APPLICATIONS

This application is a continuation of U.S. patent application Ser. No. 15/699,928, filed Sep. 8, 2017, which is a continuation of U.S. patent application Ser. No. 14/850,838, filed Sep. 10, 2015, now U.S. Pat. No. 9,757,599, which claims priority benefit of U.S. Provisional Application No. 62/048,777, filed Sep. 10, 2014. The entireties of all of the foregoing are hereby incorporated by reference herein.

BACKGROUND

Field

This application relates generally to devices, systems and methods for protecting cables and/or other members against fire, heat and/or potentially damaging events and occurrences.

Description of the Related Art

Various methods of reinforcing cables (e.g., tension cables used in bridges and other structures), columns, pipes, conduits, files, columns, beams, foundations, walls (e.g., shearwalls, non-structural walls, other walls, etc.), other structural components and/or other members against fire or heat damage (e.g., by blowtorches, flamethrowers, other fire or heat sources, etc.) or other occurrences responsible for potentially threatening such members are known. Threatening occurrences may occur intentionally or non-intentionally through one or more manmade or natural activities, such as, for example, terrorist acts, accidents, fires, other weather-related events and/or the like. Thus, there remains a need for a more reliable, efficient and cost-effective systems and methods of reinforcing cables, pipes and/or other members of a structure or system.

SUMMARY

According to some embodiments, a fireproofing system for protecting an elongate member, comprising at least one inner layer configured to at least partially wrap around itself to form an inner passage, the at least one inner layer configured to generally resist heat, and an outer shell or member defining an interior opening, wherein the first layer is configured to be positioned within the interior opening of the outer shell or outer member, wherein an elongate member is configured to pass through the inner passage.

According to some embodiments, a fireproofing system for protecting an member or a surface comprises at least one inner layer configured to at least partially cover a member or a surface, the at least one inner layer configured to generally resist heat, and an outer shell or member defining an interior region, wherein the first layer is configured to be positioned within the interior region of the outer shell or outer member, wherein system is configured to protect a member or a surface of a structure.

According to some embodiments, the at least one inner layer comprises at least one of a ceramic material and another material configured to be relatively heat resistant. In some embodiments, the another material comprises a silica or silicon-based material. In one embodiment, the at least one inner layer comprises a glass-fiber material. In some embodiments, the at least one inner layer comprises a fabric or other material that is configured to at least partially wrap around itself. In some embodiments, the at least one inner layer is configured to overlap around itself by at least 20 percent of its outer circumference. In some embodiments, the at least one inner layer is configured to overlap around itself by at least one-eighth of a circumference of the at least one inner layer.

According to some embodiments, the inner layer comprises at least one of a ceramic wool, a ceramic foam and a ceramic fabric. In some embodiments, the at least one layer is provided in sheets. In some embodiments, the at least one layer is at least partially secured to an interior wall of the outer shell or outer member.

According to some embodiments, the outer shell or member comprises a silica or silicon material. In some embodiments, the outer shell or member is configured to resist heat up to about 2000 degrees F. In some embodiments, the outer shell or member comprises a thermoplastic. In one embodiment, the outer shell or member comprises high density, polyethylene. In some embodiments, the elongate member comprises a structural cable.

According to some embodiments, the system further comprises at least one layer of felt. In some embodiments, the felt comprises recycled carbon felt. In one embodiment, the layer of felt is positioned along an interior of the at least one inner layer.

According to some embodiments, the system further comprises a material having favorable fireproofing properties. In some embodiments, the material having favorable fireproofing properties comprises an intumescent material. In one embodiment, the material having favorable fireproofing properties comprises Graphene.

According to some embodiments, the system further comprises at least one interior shell or member along an interior of the at least one inner member. In some embodiments, the at least one interior shell or member comprises a ceramic material. In some embodiments, the at least one interior shell or member comprises a material that is configured to resist heat.

According to some embodiments, the system further comprises at least one metallic inner member along the innermost portion of the system, the at least one metallic inner member being configured to provide, at a minimum, abrasion resistance to the system. In some embodiments, at least one of the at least one metallic outer member and the at least one inner member comprises steel (e.g., stainless steel). In some embodiments, the system completely or partially encircles or encapsulates the elongate member.

According to some embodiments, the R-value of the at least one inner layer is greater than 50. In some embodiments, the R-value of the at least one inner layer is between 50 and 100. In some embodiments, the R-value of the at least one inner layer is greater than 100.

According to some embodiments, a method of fireproofing a member or a surface comprises providing at least one inner layer along or around a member or a surface, the at least one inner layer configured to generally resist heat, and providing an outer shell or member around the outside of the at least one inner layer, wherein system is configured to protect a member or a surface of a structure against heat and/or fire. In some embodiments, the method further comprises providing an inner shell or member along an interior of the at least one inner layer. In some embodiments, the method further comprises providing at least one metallic member along the exterior of the outer shell or member. In one embodiment, the method additionally includes providing at least one metallic member along the interior of the inner shell or member.

According to some embodiments, a fireproofing system for protecting an elongate member comprises a first layer comprising glass fiber fabric, wherein the first layer is configured to at least partially wrap around itself to form an inner passage, and an outer pipe or shell defining an interior opening, wherein the first layer is configured to be positioned within the interior opening of the outer pipe or shell. In some embodiments, an elongate member (e.g., cable, beam, conduit, strut, other structural or non-structural component, etc.) is configured to pass through the inner passage.

According to some embodiments, the first layer comprises silica fiber fabric. In one embodiment, the first layer is provided in sheets. In some embodiments, the first layer is at least partially secured to an interior wall of the outer pipe or shell.

According to some embodiments, the outer pipe or shell comprises silicon, plastic (e.g., high density, polyethylene) and/or the like. In some embodiments, the system additionally comprises at least one layer of felt (e.g., recycled carbon felt). In some embodiments, the layer of felt is positioned along an interior of the inner layer. In some embodiments, the system further comprises a material having favorable fireproofing properties (e.g., an intumescent material, Graphene, etc.).

BRIEF DESCRIPTION OF THE DRAWINGS

These and other features, aspects and advantages of the present application are described with reference to drawings of certain embodiments, which are intended to illustrate, but not to limit, the present disclosure. It is to be understood that the attached drawings are for the purpose of illustrating concepts disclosed in the present application and may not be to scale.

DETAILED DESCRIPTION

Figure 1:
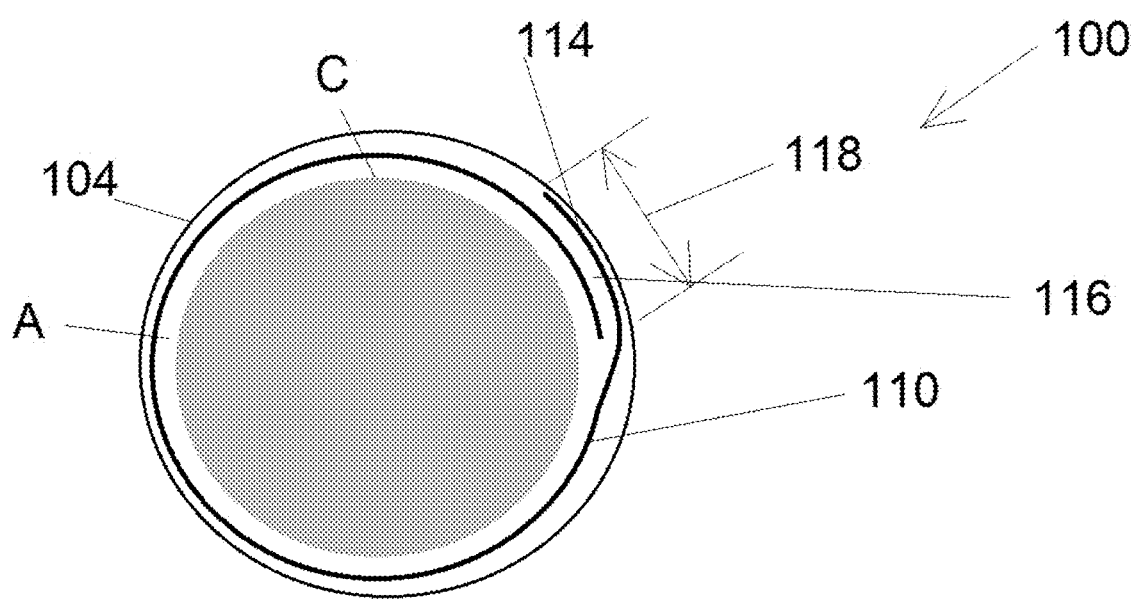
FIG. 1 illustrates a cross-sectional view of one embodiment of a cable protection system.

FIG. 1 illustrates a cross-sectional view of a protection system 100 for a structural cable C (e.g., cable bundle) or other member to be protected. The protection systems disclosed herein can be used to protect various structural and/or non-structural components or portions, including, without limitation, cables, struts, truss members, pipes, conduits, columns, beams, piles, pillars, slabs (e.g., floor slabs), ceilings, walls (e.g., shearwalls, other structural or non-structural walls), other generally planar surfaces and/or the like. Any of the protection system embodiments disclosed herein can be used to shield and/or otherwise protect a cable and/or similar member of a bridge or other structure against a threat to its integrity. For instance, in some embodiments, the cable comprises a tension cable used in a bridge (e.g., suspension bridge, cable-stayed bridge, etc.) or other structure (building, tower, etc.). In some embodiments, such cables that receive one or more forms of protection, as described herein, are pre-tensioned or post-tensioned. However, the various protection embodiments disclosed herein can be used for non-tensioned cables and/or any other member or component of a structure. The cable or other member to be protected C can include one or more strands, as desired or required for a particular structural design. For example, in some embodiments, the cable C comprises a plurality or cluster of individual stands or components that are braided, twisted or otherwise configured to remain as a unitary item or a monolithic configuration. In one embodiment, a cable includes a bundle of individual and/or braided cables that are in close proximity to one another. As used herein, the term "cable" is a broad term and refers, without limitation, to a single-strand cable, a multi-strand cable, a cluster or bundle of adjacent single-stand or multi-strand cables, any other structural member intended to provide tension resistance, other non-structural members that may need protection and/or the like. However, the various embodiments illustrated and discussed herein, or variations thereof, can be used to protect any other structural or non-structural component, such as, for example, a rod, strut, conduit, pipe, column, beam, duct, a wall, other structural surface or member and/or the like. For instance, as discussed with reference to the embodiments illustrated in FIGS. 5 to 8 herein, protective systems can be used to completely or partially planar or flat surfaces (or other non-planar or flat surfaces) of walls, beams, columns and/or the like.

Depending on a particular structural design or configuration, a cable or other member to be fireproofed and protected can be secured to one or more adjacent members, portions or surfaces (e.g., walls, foundations, slabs, connectors, etc.) along one or more cable locations (e.g., upper and/or lower end of the cable, middle or intermediate portion of the cable, etc.). For example, a bottom portion of the cable C can be coupled or attached to a cable connector (not shown), which may be designed to ensure that the cable C and/or other member or component remain securely connected thereto. Similar retaining features or members can be included along the top, middle and/or any other portion of a cable, pipe, beam and/or other member to be protected.

For any of the embodiments disclosed herein, the cable or other member that is intended to be protected can include a single, unitary construction. Alternatively, however, the various fireproofing systems can be used to protect cables or other members that comprise two or more portions (e.g., portions that are attached to one another, portions that are in proximity to each other, etc.), as desired or required. The fireproofing systems disclosed herein can be used to protect cables and/or other members of various materials. For example, the various systems disclosed herein can be used to fireproof member comprising one or more of the following: metals and/or alloys (e.g., steel, aluminum, copper, etc.), concrete, cement, masonry, plastic and other elastomers, other composites, other synthetic or naturally-occurring materials and/or the like. Further, although the cables or other members that are being fireproofed are illustrated as having a circular cross-section, any of the fireproofing embodiments discussed herein or equivalents thereof can be used to protect member having a different cross-sectional shape, including, without limitation, oval, polygonal (e.g., square, rectangular, triangular, pentagonal, hexagonal, octagonal, etc.), irregular and/or the like. As discussed, the systems disclosed herein can be used to protect walls or other members that may not include a well-defined cross-sectional area. For example, in some embodiments, one or more of the protective systems disclosed herein can be used to protect an exposed (or outer) portion of a wall, e.g., the outer 0 to 3 inches, 0 to 6 inches, 0 to 12 inches, 0 to 2 feet, 0 to 3 feet, 0 to 6 feet, ranges between the foregoing and/or the like.

With reference to the embodiment depicted in FIG. 1, the system 100 for protecting a cable C or other member can comprise an outer shell or pipe 104. The shell or pipe can comprise silica-fiber, other silica or silicon-based materials, ceramics, other high-heat resistant materials and/or other materials that are generally stable under high-heat conditions. For example, in some embodiments, the shell or pipe can be configured to maintain its structural stability at temperatures exceeding 2000° F. (e.g., 2000-2200° F., 2200-2400° F., over 2400° F., etc.). However, in other embodiments, the shell or pipe is configured to maintain its structural stability at temperatures exceeding only 200° F. (e.g., 200-400, 400-600, 600-800, 800-1000, 1000-1500, 1500-2000° F., temperatures between the foregoing, etc.). In other embodiments, the shell or pipe comprises high density, polyethylene.

Regardless of the exact materials used in its construction, the pipe or shell 104 can be sized to receive the various bundles of the cable C or other portion of the member to be protected. The shell or pipe 104 can be provided as a single cylindrical portion of unitary or one-piece construction. Alternatively, the pipe or shell 104 can comprise two or more portions that are configured to attach or otherwise couple to one another. For instance, in such a multi-part configuration, the various sections or portions of the shell or pipe 104 can be longitudinally and/or radially joinable, as desired or required.

According to some configurations, the pipe or shell 104 is manufactured with one or more layers, components and/or other portions of a fireproofing system. Thus, in such embodiments, sections of pipe can be provided to the field (e.g., a construction site) already prepared and ready for installation. Alternatively, the various layers and other components of a fireproofing system can be at least partially assembled in the field, as desired or required.

As shown in FIG. 1, one or more inner layers 110 can be positioned along the interior surface of the outer pipe or shell 104. In some arrangements, such inner layers 110 include ceramic materials and/or other ceramic items (e.g., ceramic wool, ceramic foam, ceramic blanket, etc.), silica-based materials (e.g., silica fiber fabric), other glass-fiber materials (e.g., other glass fabrics), other fabrics and/or any other material or substance. Such inner layers 110 can be provided in sheets or rolls. Accordingly, the length and width of the inner layers can vary, as desired or required. In some embodiments, the thickness of the inner layers (e.g., ceramic wool, silica fabric, etc.) is 0.1 to 10 mm (e.g., 0.1-0.2, 0.2-0.3, 0.3-0.4, 0.4-0.5, 0.5-0.6-0.7, 0.7-0.8, 0.8-0.9, 0.9-1, 1-2, 2-3, 3-4, 4-5, 5-6, 6-7, 7-8, 8-9, 9-10 mm, thicknesses between the foregoing ranges, etc. In some embodiments, the inner layer(s) 110 (e.g., ceramic materials, silica fiber fabric, other fabrics or foams, etc.) is/are applied to and/or along the interior surface of the outer pipe or shell 104. One or more adhesives or other attachment devices, techniques and/or methods can be used to continuously or intermittently secure the inner layer(s) 110 to the outer pipe or shell 104.

In some embodiments, the inner layers are generally heat and/or fire resistant. Likewise, such inner layers typically have a relatively high resistance to heat penetration (e.g., relatively high R-values). For example, in some embodiments, the R-values of the inner layers of the various protective systems disclosed herein are greater than 50 (e.g., 50-60, 60-70, 70-80, 80-90, 90-100, values between the foregoing ranges, greater than 100, etc.).

According to some embodiments, the ceramic wool, silica fiber fabric or other inner layer 110 can include one or more coatings. For example, the fabric 110 can comprise silica, other fireproofing coatings or layers and/or the like. This can help maintain the position of the inner layer 110 relative to the pipe or shell 104.

As shown in FIG. 1, in some embodiments, the inner layer 110 can be installed or otherwise positioned so that a section 114 of the inner layer overlaps itself. The amount of the overlap 118 can vary, as desired or required for a particular application or installation. In some embodiments, for instance, the overlap 114 extends from about one-eighth to about one-half of the circumference or perimeter of the pipe or shell 104. However, in other embodiments, the overlap amount 118 can be less than about one-eighth or greater than about one-half of the circumference or perimeter of the pipe or shell 104, as desired or required. In some configurations, one or more substances or other materials can be positioned between 116 the adjacent portions of the inner layer 110 (e.g., silica fiber fabric) along the overlap 114 to help secure the portions to one another. For example, a ceramic bonding agent, another high temperature bonding agent and/or any other adhesive can be used between the adjacent portions of the inner layer 110. In other embodiments, one or more other coupling or attachment devices or methods can be used to intermittently or continuously secure the adjacent portions of the inner layer to one another along the overlap, either in addition to or in lieu of adhesives (e.g., staples, other mechanical fasteners, etc.). In some embodiments, the silica fiber fabric or other inner layer 110 can include bond holes and/or other features (e.g., recessed, bumps, etc.) that can facilitate the adhesion between the adjacent portions of the inner layer 110 along the overlap 114. Such holes or other features can be provided to the inner layer 110 during manufacturing or in the field prior to or during installation.

In some embodiments, once the pipe or shell 104 is lined with the inner layer (e.g., silica fiber fabric), cable C or any other member to be protected by the system 100 can pass through the opening of the pipe 104 together with the fireproofing components positioned therein. In some embodiments, the bundles or fibers that comprise the cable C are passed individually through the interior bore of the pipe or shell 104. The area, clearance or space (e.g., annular space A) between the outer surface of the cable C or other member to be protected and the adjacent interior surfaces of the fireproofing system 100 incorporated into the pipe 104 can vary. In some embodiments, since the cable or other member to be protected is passed through the interior opening of the system 100, the various interior layers (e.g., the innermost layer, such as the inner layer in FIG. 1) can be hardened. This can provide the necessary and/or desired strength, durability, wear resistance and/or other physical characteristics to the system 100. In other arrangements, as noted herein, the pipe or shell 104 is configured to be installed in two or more radial portions (e.g., around the cable or other member to be protected). Thus, in such configurations where the inner layers of the system may not encounter wear and tear, the need for hardening or other physical strengthening or reinforcing may not be necessary or desirable.

Figure 2:
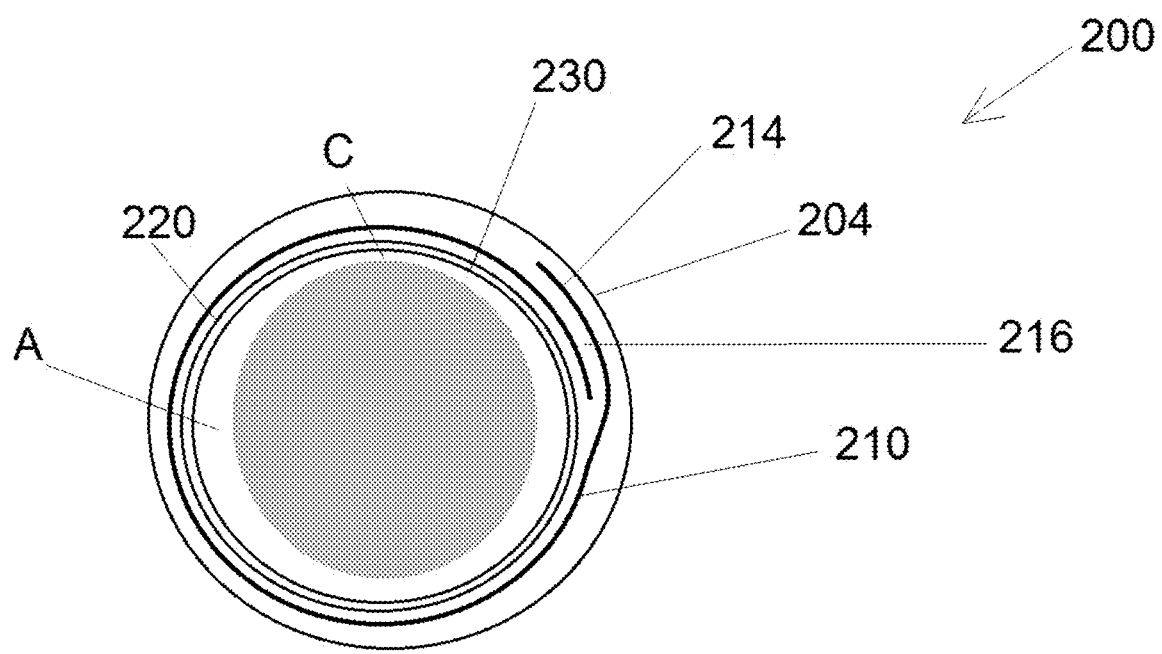
FIG. 2 illustrates a cross-sectional view of another embodiment of a cable protection system.

FIG. 2 illustrates a cross-sectional view of another fireproofing system 200 that can be used to protect cables or other members C. As with the arrangement of FIG. 1, the illustrated system 200 comprises one or more inner layers 210 (e.g., silica fiber fabric). The silica fiber fabric 210 or similar layer can be as described herein with reference to FIG. 1. For example, the fabric 210 can include an overlap region 214, a bonding agent can be positioned between 216 adjacent portions of the fabric 210 along the overlap, it can be configured to secure to the interior surface of a pipe or shell 204 (e.g., high density, polyethylene pipe) and/or the like.

As shown, the embodiment of FIG. 2 additionally comprises one or more intermediate layers 230 positioned along the interior of the fabric or other inner layer 210 (e.g., between the fabric 210 and an exterior of the cable C or other member being protected). In some configurations, such an intermediate layer 230 comprises felt, such as, for example, recycled carbon felt. The thickness of the felt or other intermediate layer(s) 200 can vary, as desired or required. In some embodiments, for instance, the thickness of the intermediate layer 230 is ⅛ inch to ½ inch (e.g., ⅛ to ¼, ¼ to ⅜, ⅜ to ½ inch, thicknesses between the foregoing, etc.). In other arrangements, the thickness of the intermediate layer 230 can be less than ⅛ inch or greater than ½ inch, as required or desired for a particular application or use. The carbon felt or other intermediate layer 230 can be located immediately adjacent to the cable C or other member being protected. In some embodiments, the intermediate layer 230 is adhered or otherwise secured to the inner layer 210, either directly or indirectly.

According to some embodiments, one or more layers, coatings or other materials can be positioned between the intermediate layer 230 and the inner layer 210. For example, as illustrated in FIG. 2, such a layer or coating 220 can comprise one or more intumescent materials or substances and/or other materials with favorable fireproofing properties, such as, for example, silicates, Graphene, graphite, resins, materials with a relatively high hydrate content and/or the like. In some embodiments, such a layer or coating of intumescent materials or substances can be placed along the exterior surface of the inner layer 210 (e.g., between the inner layer and the pipe 204), either in addition to or in lieu of such a layer or coating 220 being positioned between the fabric 210 and the intermediate layer 230.

In other embodiments, a fireproofing system can comprise a simpler design. For example, the fireproofing system can include one or more layers of felt (e.g., carbon felt). Such felt can, in certain configuration, comprise one or more fireproofing coatings, layers and/or additives, such as, for instance, silica. Such layers can be positioned along the outside of a cable C or other member to be protected, regardless of whether additional layers or components are included, such as, for example, an outer pipe or shell. In some embodiments, such layers can be directly secured to one or more outside surfaces of a cable or other member to be protected.

Figure 3:
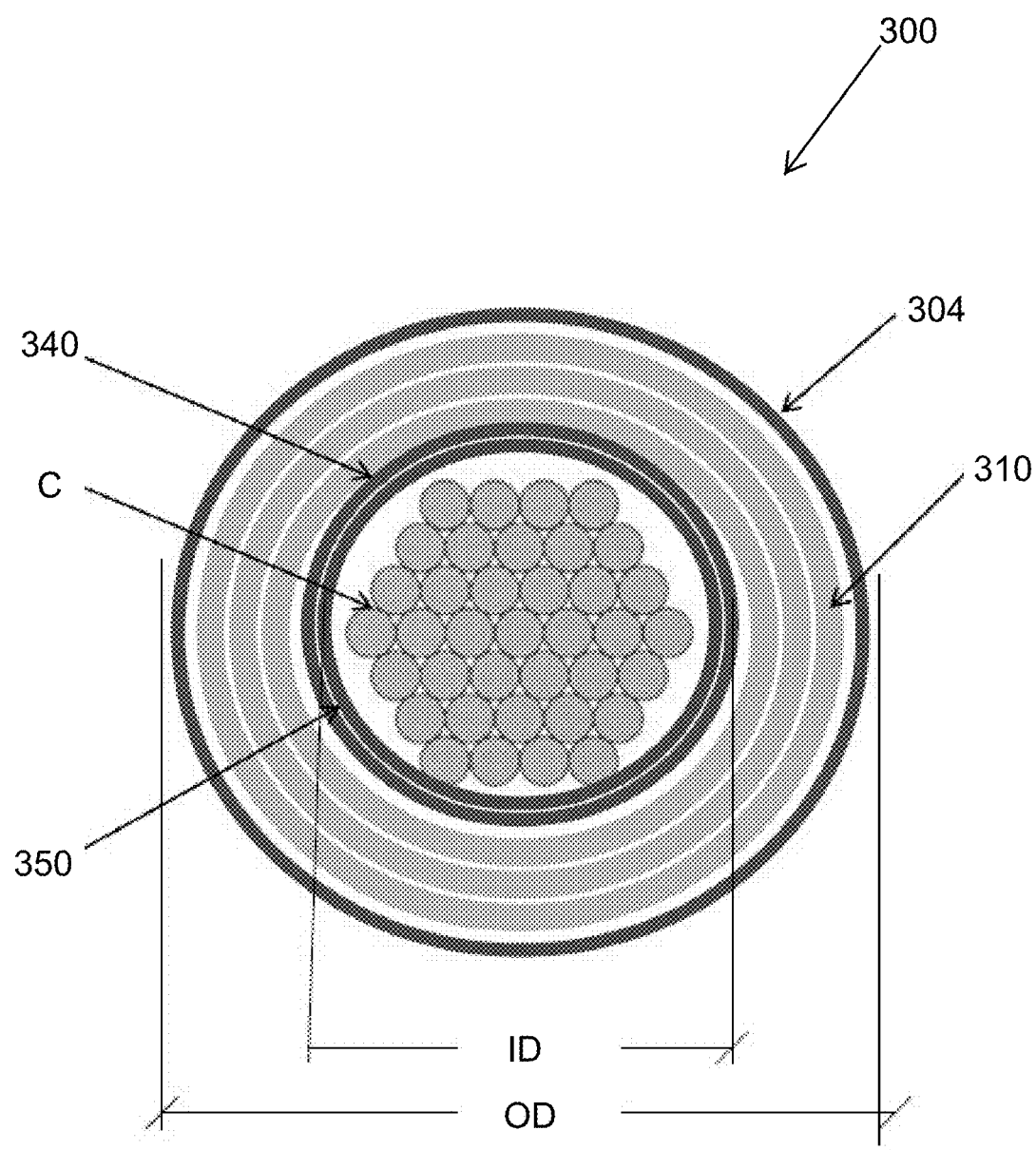
FIG. 3 illustrates a cross-sectional view of one embodiment of a protection system.

FIG. 3 illustrates a cross-sectional view of another system 300 configured to protect a cable or other member C. As shown, the system 300 comprises an outer shell or pipe 304. In some embodiments, the shell or pipe comprises high-heat resistant materials, such as, for example, silicon or silica-based materials (e.g., silica fiber). However, in other arrangements, the shell or pipe can include one or more other materials, either in lieu of or in additional to silica, such as, for example, high-density polyethylene, other plastic materials and/or the like. In some embodiments, the shell or pipe 304 is configured to maintain its structural stability at temperatures exceeding 2000° F. (e.g., 2000-2200° F., 2200-2400° F., over 2400° F., etc.). However, in other embodiments, the shell or pipe is configured to maintain its structural stability at temperatures exceeding only 200° F. (e.g., 200-400, 400-600, 600-800, 800-1000, 1000-1500, 1500-2000° F., temperatures between the foregoing, etc.). In some embodiments, the outer shell, pipe or other member 304 includes one or more coatings or layers. Such coating or layers can help improve one or more properties of the shell or pipe, and thus, the overall system. For example, in some embodiments, a shell 304 comprising silica-fiber can include a silicone rubber coating or layer along its exterior and/or interior surface(s), as desired or required. Such coatings or layers can help to further enhance the fire and/or heat resistive properties of the shell 304.

With continued reference to the embodiment illustrated in FIG. 3, the system 300 comprises one or more inner layers 310 that are positioned along an interior space defined by the outer shell or pipe 304. In some embodiments, the inner layers 310 include a silica fiber fabric and/or another type of glass fiber fabric and/or other fabrics or similar materials. The silica fiber fabric can be provided in sheets or rolls. However, the inner layer(s) 310 can include any other material, either in lieu of or in addition to glass fiber, as desired or required. FIG. 3 schematically illustrates the inner layer 310 having 3 separate layers; however, in other embodiments, more (e.g., 4, 5, 6 or more) or fewer (e.g., 1 or 2) layers can be used, as desired or required.

As noted herein with reference to other embodiments, the arrangement schematically illustrated in FIG. 3 depicts a clearance between the outer shell or pipe 304 and the inner layer(s) 310. However, the inner layer(s) can be directly or indirectly secured (e.g., continuously or intermittently) to an interior of the shell or pipe 304. In other embodiments, a certain spacing or clearance is provided between the shell 304 and the inner layer(s) 310, as desired or required for a particular application or design.

With further attention to the embodiment schematically illustrated in FIG. 3, the protection system 300 can include an inner shell or pipe 340. In some embodiments, the inner shell or pipe 340 is identical or similar to the outer shell or pipe 304. For example, the inner shell or pipe 340 can include silicon, thermoplastic (e.g., high density polyethylene, etc.) and/or any other material. However, in other embodiments, the inner shell or pipe 340 can include a different construction than the outer shell or pipe 304, as desired or required.

In some embodiments, as schematically illustrated in FIG. 3, inner and outer shells or pipes 304, 340 define an annular area in which one or more inner layers 310 are positioned. In some embodiments, the inner layers 310 are attached to one or both of the inner and outer shells 304, 340, as desired or required, e.g., using one or more adhesives, other attachment methods or devices, etc. In other arrangements, however, the inner layers 310 are separate and detached from one or both of the outer and inner shells or pipes 304, 340, in accordance with a desired or required designed or configuration. Thus, in some embodiments, the inner layer(s) 310 are configured to freely move relative to the outer shell or pipe 310 and/or the inner shell or pipe 340.

With continued reference to the schematic of FIG. 3, the protection system 300 can include one or more additional layers or members. For example, the arrangement schematically illustrated in FIG. 3 comprises a metallic tube or shell 350 along the interior of the inner tube or shell 340. In some embodiments, the metallic shell comprises steel (e.g., carbon steel, stainless steel, etc.), another metal, an alloy and/or the like. In other embodiments, the tube or shell 350 comprises one or more other rigid or semi-rigid materials, either in addition to or in lieu of steel and/or other metallic materials, as desired or required. In some embodiments, the metallic tube or shell 350 comprises a steel tube having a thickness of approximately 0.125 to 2 inches (e.g., 0.125-0.25, 0.25-0.5, 0.5-0.75, 0.75-1 1-1.5, 1.5-2 inches, thicknesses between the foregoing, etc.), as desired or required for a particular application or use.

For any of the embodiments, disclosed herein (e.g., the system 300 disclosed in FIG. 3), the system can comprise an outer shell or other outer member 304. Such an outer shell 304 can help protect the interior components of the system (e.g., the ceramic wool/foam, the silica or other glass-fiber fabric, other inner layers) from the elements (e.g., wind, precipitation, sunlight, etc.). Further, one or more interiorly-located shells or members (e.g., the inner shell 340, the metallic shell 350, etc.) can likewise protect the inner layers 310 from abrasion, other friction-related damage, precipitation and/or the like. For example, such interiorly-located members can help prevent damage to the inner layers when the cables are moved relative to the protective system (e.g., during installation, during normal relative movement after installation, etc.).

In any of the embodiments disclosed herein, the protective systems include one or more components that are configured to resist heat (e.g., in order to shield the underlying cables or other structural components or members being protected). For example, in many embodiments, the protective systems include one or more inner layers that are generally heat and/or fire resistant. Likewise, such layers typically have a relatively high resistance to heat penetration (e.g., relatively high R-values). For example, in some embodiments, the R-values of the inner layers of the various protective systems disclosed herein are greater than 50 (e.g., 50-60, 60-70, 70-80, 80-90, 90-100, values between the foregoing ranges, greater than 100, etc.). For any of the embodiments disclosed herein, or variations thereof, such inner layers can include ceramic materials and/or other ceramic items (e.g., ceramic wool, ceramic foam, ceramic blanket, etc.). In other arrangements, one or more other materials can be used in the inner layers, either in addition to or in lieu of ceramic-based materials. For example, the inner layers can include silica fabric, other silica-based materials, glass fiber materials and/or the like.

For any of the protective system embodiments disclosed herein, the inner layers can be generally compressible or otherwise capable of being squeezed (e.g., for positioning between inner and/or outer shells or components). Thus, in some embodiments, the inner layers are compressed within adjacent inner and outer pipes or shells or other members (e.g., plates). This can advantageously permit the overall size (e.g., thickness, diameter, etc.) of the corresponding protective member to be reduced, while still maintaining the requisite amount of thermal protection for the cables or other members being shielded. For example, compressing the inner layers can reduce the size of the outer shell and/or other components of the systems; as a result, the overall size and weight of the protective system can be advantageously reduced. In some embodiments, the inner layers are compressed to about 30% to 70% (e.g., 30-35, 35-40, 40-45, 45-50, 50-55, 55-60, 60-65, 65-70%, percentages between the foregoing ranges, etc.) of their original thickness when positioned within the protective system. However, in other embodiments, the inner layers are compressed to less than 30% or greater than 70% of their original thickness when positioned within the protective system, as desired or required. In some embodiments, regardless of whether (or to what extent) the inner layers are compressed, the inner layers can be attached to each other and/or adjacent components of the system (e.g., outer shell, inner shell, etc.) using one or more connection devices or methods, such as, for example, adhesives, fasteners and/or the like.

Figure 4:
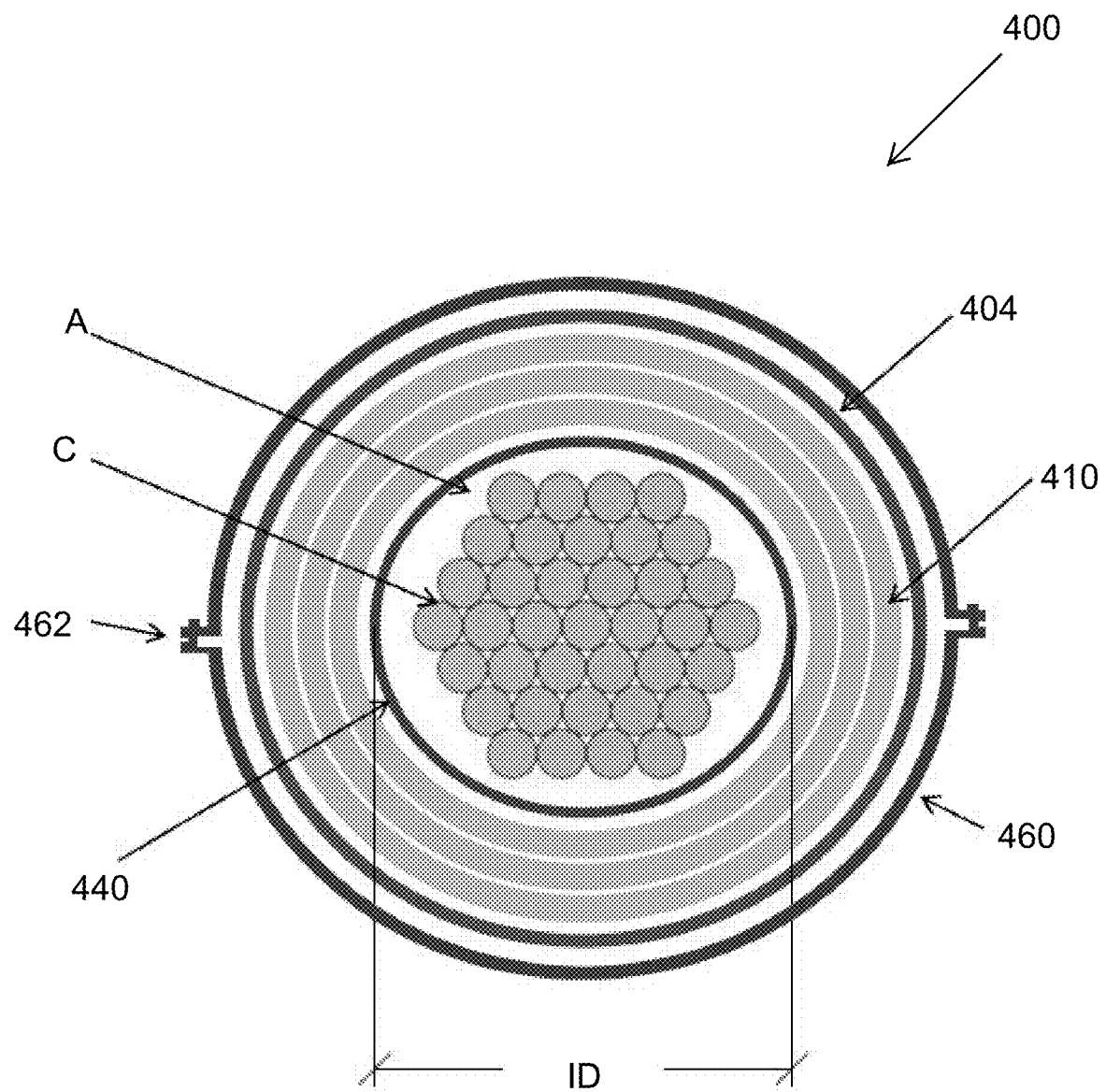
FIG. 4 illustrates a cross-sectional view of another embodiment of a protection system.

FIG. 4 schematically illustrates a cross-sectional view of another embodiment of a protection system 400 that can be used to shield cables C or any other member. As with other arrangements disclosed herein, the depicted system 400 includes a generally circular cross-sectional shape and is well-suited for encapsulating or surrounding, at least partially, a member to be protected (e.g., cable, column, pipe, etc.). However, the various components and/or other features of the illustrated system 400 can be incorporated into other protective systems that are non-circular.

With continued reference to FIG. 4, the system 400 can comprise heat resistant inner layers 410 situated between adjacent outer and inner shells or other members 404, 440 (e.g., similar to the embodiment of FIG. 3 and others disclosed herein). As noted in greater detail above, in some embodiments, the inner layers (e.g., ceramic wool or foam, other ceramic-based materials, silica fabric, other glass fiber fabric or materials, etc.) 410 can be compressed between the outer and inner shells or members 404, 440. This can advantageously reduce the thickness of the inner layer portion of the system, and thus, the overall size and weight of the protection system 400.

As noted herein with reference to other systems, the outer shell 404 and/or the inner shell 440 of the system 400 can be configured to provide heat and/or fire protection (e.g., to the inner layers 410). For example, in some embodiments, the outer and/or inner shells or members 404, 440 comprise silica-fiber, other silica-based materials, ceramics, other high-heat resistant materials, thermoplastics (e.g., high density polyethylene, etc.) and/or the like. Accordingly, in some arrangements, the outer shell 404 can provide a requisite level of protection to the inner layers 410 and other components of the system 400 against heat, fire and the like. In addition, the outer shell 404 can provide protection to such components of the system against the elements (e.g., wind, precipitation, sunlight, dirt, other environmental conditions, etc.) to which the system will be exposed after installation.

With continued reference to FIG. 4, the system 400 further comprises an exterior shell member 460 along the outside of the outer shell 404. In some embodiments, such an exterior shell member 460 comprises one or more metallic and/or other rigid materials. For example, in some arrangements, the exterior shell member 460 comprises stainless steel, other metals and/or alloys and/or the like, as desired or required. The exterior shell member 460 can provide additional protection to the system 400, e.g., against environmental elements (e.g., heat, sunlight, fire, wind, humidity, precipitation, etc.). The thickness of the exterior shell member 460 can be approximately 0.125 to 2 inches (e.g., 0.125-0.25, 0.25-0.5, 0.5-0.75, 0.75-1 1-1.5, 1.5-2 inches, thicknesses between the foregoing, etc.), as desired or required for a particular application or use In addition, one or more coatings or layers can be provided to the interior and/or exterior surface of the exterior shell member 460 to provide additional protection against the elements.

An exterior shell member 460 similar to the one included in the system 400 illustrated in FIG. 4 can be incorporated into any of the embodiments disclosed herein or variations thereof, including non-circular systems (e.g., see FIGS. 5 to 8). In some embodiments, the exterior shell member 460 can be provided as a single or unitary member. However, as depicted in FIG. 4, the exterior shell member 460 can include two or more portions (e.g., two hemispherically-shaped shells). In such arrangements, the two or more portions of the exterior shell member 460 can be connected to each other using bolts and nuts or other hardware 462 (as illustrated, e.g., in FIG. 4). However, one or more other attachment methods or devices can be used to secure the various sections or portions of the exterior shell member 460 to one another (e.g., tabs, flanged connections, welds, rivets, other mechanical fasteners or connectors, adhesives, press-fit or friction-fit connections, etc.).

As with any of the embodiments disclosed herein, a particular annular space or clearance A may be provided between the interior of the system 400 and the outside surface of the cables or other member being protected C, as desired or required. Thus, the systems can be permitted to move (e.g., longitudinally, laterally, etc.) relative to the cable or other member being protected C.

In some embodiments, although not explicitly illustrated in the accompanying figures, a protection system can include metallic or other rigid shells or other members along both the exterior and the interior of the system. Accordingly, in such configurations, the system can be provided with additional protection against the elements, abrasion, corrosion and/or any other potentially damaging events or occurrences.

As noted herein, the protection system embodiments disclosed herein can be used to shield and/or otherwise protect members, surfaces and other items besides cables. For example, the protection system can be used to protect beams, columns, rails, pipes, conduits, pillars, piles, shear-walls, other walls or generally planar or flat surfaces, foundations, slabs, ceilings and the like. Protection systems can be configured to partially or fully surround, encircle, encapsulate and/or otherwise cover such items and other members. Example embodiments of protection systems that can be used to protect such items are schematically illustrated herein in FIGS. 5 to 8.

Figure 5:
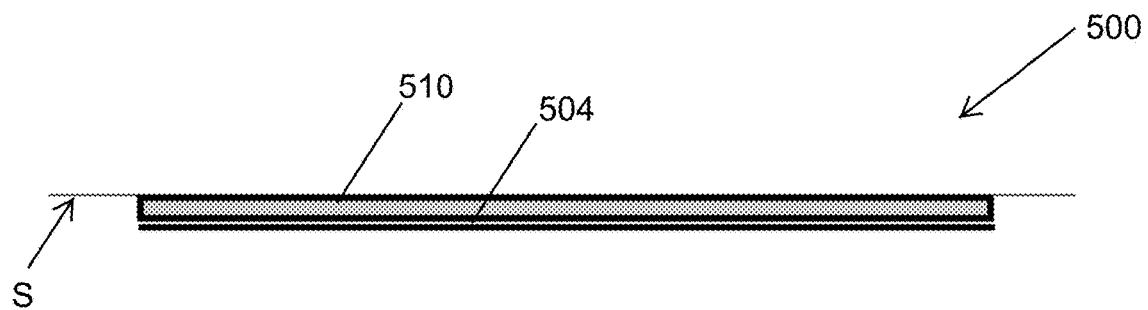
FIGS. 5 to 8 illustrate cross-sectional views of embodiments of protection systems for walls or other members having a flat or generally flat surface.

With reference to FIG. 5, a protection system 500 can be used to at least partially cover a wall or other surface S. As shown, in some embodiments, the system 500 comprises an outer member or shell 504. As noted above with reference to other arrangements, the outer member or shell 504 can comprise high-heat resistant materials, such as, for example, silicon or silica-based materials (e.g., silica fiber). However, in other arrangements, the shell or pipe can include one or more other materials, either in lieu of or in additional to silica, such as, for example, high-density polyethylene, other plastic materials and/or the like. In some embodiments, the shell or member 504 is configured to maintain its structural stability at temperatures exceeding 2000° F. (e.g., 2000-2200° F., 2200-2400° F., over 2400° F., etc.). However, in other embodiments, the shell or pipe is configured to maintain its structural stability at temperatures exceeding only 200° F. (e.g., 200-400, 400-600, 600-800, 800-1000, 1000-1500, 1500-2000° F., temperatures between the foregoing, etc.). In some embodiments, the outer shell, pipe or other member 504 includes one or more coatings or layers. Such coating or layers can help improve one or more properties of the shell or pipe, and thus, the overall system. For example, in some embodiments, a shell or member 504 comprising silica-fiber can include a silicone rubber coating or layer along its exterior and/or interior surface(s), as desired or required. Such coatings or layers can help to further enhance the fire and/or heat resistive properties of the shell or member 504.

With continued reference to FIG. 5, the system 500 can comprise one or more inner layers 510 that are positioned along an interior space defined by the outer shell or outer member 504. In some embodiments, as discussed herein with reference to other arrangements, the inner layers 510 include a silica fiber fabric and/or another type of glass fiber fabric and/or other fabrics or similar materials. The silica fiber fabric can be provided in sheets or rolls. However, the inner layer(s) 510 can include any other material, either in lieu of or in addition to glass fiber, as desired or required. The inner layer(s) can include one, two or more layers, as desired or required. As noted herein, such layers can be compressed during installation to advantageously reduce the overall width (e.g., thickness), and thus, the overall size and weight of the protection system 500.

As schematically illustrated in the arrangement in FIG. 5, a clearance can be provided between the outer shell or member 504 and the inner layer(s) 510. However, the inner layer(s) can be directly or indirectly secured (e.g., continuously or intermittently) to an interior of the outer shell or member 504, as desired or required. In other embodiments, a certain spacing or clearance is provided between the shell 504 and the inner layer(s) 510, as desired or required for a particular application or design.

In some arrangements, such inner layers 510 include ceramic materials and/or other ceramic items (e.g., ceramic wool, ceramic foam, ceramic blanket, etc.), silica-based materials (e.g., silica fiber fabric), other glass-fiber materials (e.g., other glass fabrics), other fabrics and/or any other material or substance. Such inner layers 510 can be provided in sheets or rolls. Accordingly, the length and width of the inner layers can vary, as desired or required. In some embodiments, the thickness of the inner layers (e.g., ceramic wool, silica fabric, etc.) is 0.1 to 10 mm (e.g., 0.1-0.2, 0.2-0.3, 0.3-0.4, 0.4-0.5, 0.5-0.6-0.7, 0.7-0.8, 0.8-0.9, 0.9-1, 1-2, 2-3, 3-4, 4-5, 5-6, 6-7, 7-8, 8-9, 9-10 mm, thicknesses between the foregoing ranges, etc. In some embodiments, the inner layer(s) 510 (e.g., ceramic materials, silica fiber fabric, other fabrics or foams, etc.) is/are applied to and/or along the interior surface of the outer pipe or member 504. One or more adhesives or other attachment devices, techniques and/or methods can be used to continuously or intermittently secure the inner layer(s) 510 to the outer pipe or member 504.

In some embodiments, the inner layers are generally heat and/or fire resistant. Likewise, such inner layers typically have a relatively high resistance to heat penetration (e.g., relatively high R-values). For example, in some embodiments, the R-values of the inner layers of the various protective systems disclosed herein are greater than 50 (e.g., 50-60, 60-70, 70-80, 80-90, 90-100, values between the foregoing ranges, greater than 100, etc.).

According to some embodiments, the ceramic wool, silica fiber fabric or other inner layer 510 can include one or more coatings. For example, the fabric 510 can comprise silica, other fireproofing coatings or layers and/or the like. This can help maintain the position of the inner layer 510 relative to the pipe or member 504.

Figure 6:
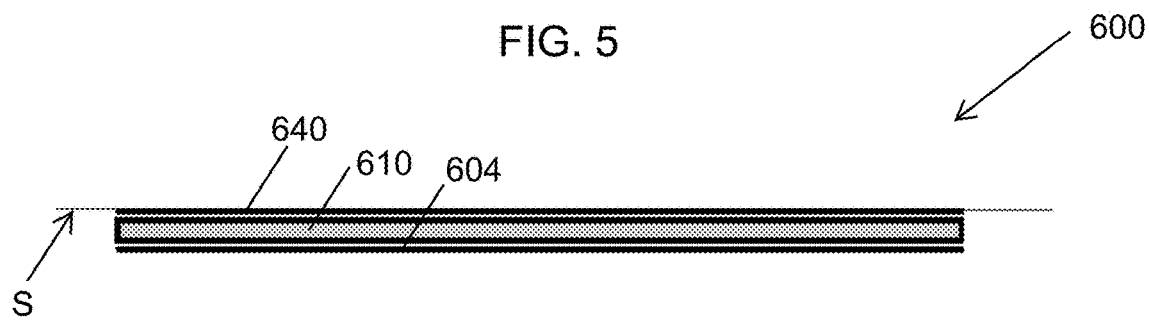

With attention to the embodiment schematically illustrated in FIG. 6, the protection system 600 can include an inner shell or pipe 640. In some embodiments, the inner shell or member 640 is identical or similar to the outer shell or member 604. For example, the inner shell or member 650 can include a silicon or silica-based material, thermoplastic (e.g., high density polyethylene, etc.) and/or any other material. However, in other embodiments, the inner shell or member 640 can include a different construction than the outer shell or member 604, as desired or required.

In some embodiments, one or more inner layers 610 are positioned between the outer and inner shells or members 604, 640. As discussed in greater detail herein, such inner layers 610 can be at least partially compressed in an effort to reduce the overall size (e.g., thickness) and weight of the protection system 600. The inner shell or member 640 can comprise a similar (e.g., identical) or different design and/or construction from the outer shell or member 604, as desired or required. In some embodiments, the inner shell or member 640 is positioned immediately adjacent the wall or other surface S being protected. However, in other arrangements, a certain spacing or clearance (and/or intermediate layer or member) can be positioned between the inner shell or member 640 and the surface S.

Figure 7:
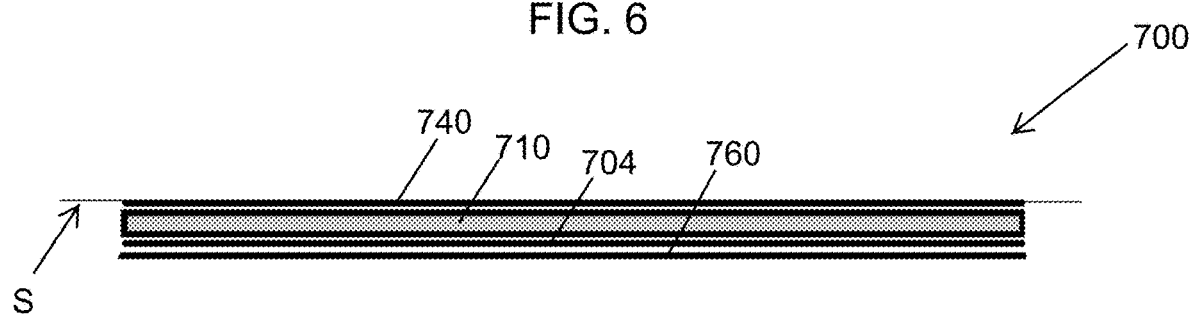

FIG. 7 schematically illustrates another variation of the embodiments depicted in FIGS. 5 and 6 and discussed above. As shown, the system 700 can further include an exterior shell member 760. In some embodiments, such an exterior shell member 760 comprises one or more metallic and/or other rigid materials. For example, in some arrangements, the exterior shell member 760 comprises stainless steel, other metals and/or alloys and/or the like, as desired or required. The exterior shell member 760 can provide additional protection to the system 700, e.g., against environmental elements (e.g., heat, sunlight, fire, wind, humidity, precipitation, etc.). The thickness of the exterior shell member 760 can be approximately 0.125 to 2 inches (e.g., 0.125-0.25, 0.25-0.5, 0.5-0.75, 0.75-1 1-1.5, 1.5-2 inches, thicknesses between the foregoing, etc.), as desired or required for a particular application or use. In addition, one or more coatings or layers can be provided to the interior and/or exterior surface of the exterior shell member 760 to provide additional protection against the elements.

Figure 8:
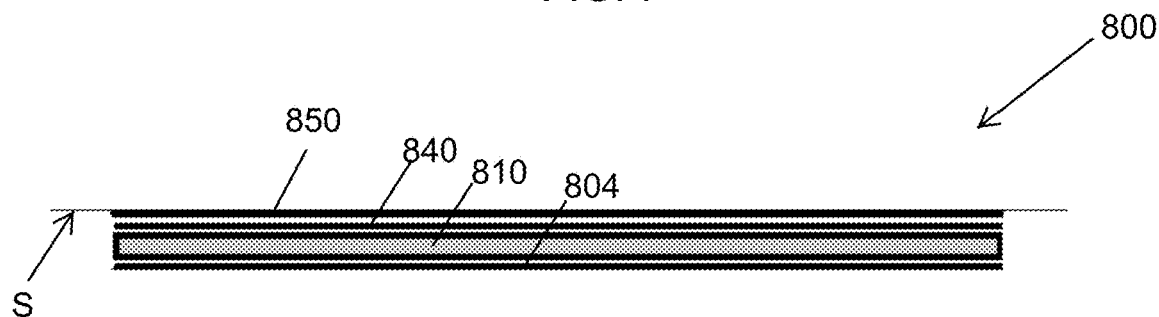

FIG. 8 schematically illustrates yet another embodiment of a protection system 800 for a wall or other generally planar surface (e.g., shearwall, other wall, beam, column, slab, foundation, ceiling, etc.) S. As shown, the system 800 can comprise one or more interior members or shells 850. In some embodiments, the inner shell or member 840 is identical or similar to the outer shell or pipe 804. For example, the arrangement schematically illustrated in FIG. 8 comprises a metallic shell or member 850 along the interior of the inner shell 840. In some embodiments, the metallic shell comprises steel (e.g., carbon steel, stainless steel, etc.), another metal, an alloy and/or the like. In other embodiments, the tube or shell 850 comprises one or more other rigid or semi-rigid materials, either in addition to or in lieu of steel and/or other metallic materials, as desired or required. In some embodiments, the metallic shell or member 850 comprises a steel tube having a thickness of approximately 0.125 to 2 inches (e.g., 0.125-0.25, 0.25-0.5, 0.5-0.75, 0.75-1 1-1.5, 1.5-2 inches, thicknesses between the foregoing, etc.), as desired or required for a particular application or use.

For any of the embodiments, disclosed herein (e.g., the system 300 disclosed in FIG. 3), the system can comprise an outer shell or other outer member 304. Such an outer shell 304 can help protect the interior components of the system (e.g., the ceramic wool/foam, the silica or other glass-fiber fabric, other inner layers) from the elements (e.g., wind, precipitation, sunlight, etc.). Further, one or more interiorly-located shells or members (e.g., the inner shell 340, the metallic shell 350, etc.) can likewise protect the inner layers 310 from abrasion, other friction-related damage, precipitation and/or the like. For example, such interiorly-located members can help prevent damage to the inner layers when the cables are moved relative to the protective system (e.g., during installation, during normal relative movement after installation, etc.).

In some embodiments, although not explicitly illustrated in the accompanying figures, a protection system for a wall or other generally planer surface S can include metallic or other rigid shells or other members along both the exterior and the interior of the system. Accordingly, in such configurations, the system can be provided with additional protection against the elements, abrasion, corrosion and/or any other potentially damaging events or occurrences.

The embodiments schematically illustrated in FIGS. 5 to 8 can be secured to the wall or other surface to be protected using one or more attachment devices or methods, such as, for example, bolts (e.g., with nuts), other fasteners, adhesives and/or the like. In some embodiments, such bolts, other fasteners and/or other attachments devices are configured to only attach one or more of the innermost layers or members to the wall or other surface to be protected. For example, a plurality of bolts, screws and/or other fasteners can be used to attach the inner shell or member 640, 740 (see FIGS. 6 and 7). Alternatively, additional portions of the systems can be secured to the wall or other surface of the structure or member to be protected, such as for example, the inner layers, the outer shell or member, the exterior shell member, the interior shell member and/or the like.

In some embodiments, stainless steel bolts, heat/fire-resistant tape, epoxies and/or other heat-resistant components can be used to secure the protective systems 500, 600, 700, 800 to the wall or other member S. The use of such components can help ensure that heat does not disadvantageously pass through potentially weak spots or points of the system to the surfaces or members being protected.

In some embodiments, as schematically illustrated in FIG. 8, the system 800 can include a metallic or other rigid shell or other member 850 along its interior surface, e.g., along and adjacent the wall or other surface S being protected. For example, the arrangement schematically illustrated in FIG. 8 comprises a metallic shell or member 850 along the interior of the inner shell or member 840, e.g., along the wall or other surface being protected S. In some embodiments, the metallic shell comprises steel (e.g., carbon steel, stainless steel, etc.), another metal, an alloy and/or the like. In other embodiments, the shell or member 850 comprises one or more other rigid or semi-rigid materials, either in addition to or in lieu of steel and/or other metallic materials, as desired or required. In some embodiments, the metallic shell or member 850 comprises a steel tube having a thickness of approximately 0.125 to 2 inches (e.g., 0.125-0.25, 0.25-0.5, 0.5-0.75, 0.75-1 1-1.5, 1.5-2 inches, thicknesses between the foregoing, etc.), as desired or required for a particular application or use.

MISCELLANEOUS

In some embodiments, a system can be used to provide protection to bridge structures that are subject to freezing conditions. Such freezing potential equates to or results in occasional icing that occurs on the cable surfaces. As conditions evolve through differing weather patterns, the ice that forms delaminates causing a potential hazard to people, vehicles, other structures or items and/or the like. Accordingly, a de-icing and/or ice prevention or ice mitigation system can be used to protect against such potential hazards.

As a first step for implementing such an ice protection system, the cable criteria of system parameters are quantified. Parameters can include, but are not limited to, length of freeze protection requirements (e.g., total cable lengths of desired protection area or areas, the diameter of the cable, the diameter of any outer pipe or shell (e.g., metallic or other rigid member, pipe or shell comprising silica-fiber, other silica or silicon-based materials, ceramics, other high-heat resistant materials, HDPE and/or the like) positioned along the exterior of the cable, analysis of the space between cable strands and the pipe, tube or other member, determination of the outer diameter of tube for insertion, the head pressure required for overall maximum height of system, the size of the pumps and heat source required. The pump, determination of the areas to locate auxiliary heat and pump equipment, determination of electrical energy sources and requirements for power, calculations of required quantities of glycol (and/or other anti-freeze agent) for the system, determination of the quantity and spacing of temperature sensors, identification of heat source, pumps, controller and/or the like.

According to some embodiments, an installation procedure can be as provided below. A tube (e.g., of a predetermined size) can be installed into the area between the casing or shell that at least partially surrounds the cable and the cable by routing the tube into the space. Then, the line can be looped back to origination or to the termination point. Next, in some embodiments, a heat and pump system can be installed into a protected area or box provided for this purpose. Glycol and/or some other anti-freeze agent or solution can be provided for the heating fluid. In some arrangements, one or more sensors are installed (e.g., to sense a temperature, to provide feedback control, etc.). In some embodiments, the system can be activated and the sensors can be connected. Then, the system can be configured to initiate heating (e.g., when the outside temperature drops below a particular threshold, such as, for example, 40 degrees F.).

The systems, apparatuses, devices and/or other articles disclosed herein may be formed through any suitable means. The various methods and techniques described above provide a number of ways to carry out the inventions. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Although several embodiments and examples are disclosed herein, the present application extends beyond the specifically disclosed embodiments to other alternative embodiments and/or uses of the inventions and modifications and equivalents thereof. It is also contemplated that various combinations or subcombinations of the specific features and aspects of the embodiments may be made and still fall within the scope of the inventions. Accordingly, it should be understood that various features and aspects of the disclosed embodiments can be combine with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

While the embodiments disclosed herein are susceptible to various modifications, and alternative forms, specific examples thereof have been shown in the drawings and are herein described in detail. It should be understood, however, that the inventions are not to be limited to the particular forms or methods disclosed, but, to the contrary, the inventions are to cover all modifications, equivalents, and alternatives falling within the spirit and scope of the various embodiments described and the appended claims. Any methods disclosed herein need not be performed in the order recited. The methods disclosed herein include certain actions taken by a practitioner; however, they can also include any third-party instruction of those actions, either expressly or by implication. For example, actions such as "providing" include "instructing providing." The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 mm" includes "10 mm." Terms or phrases preceded by a term such as "substantially" include the recited term or phrase. For example, "substantially parallel" includes "parallel."

What is claimed is:

1. A system for protecting a member, comprising:
at least one inner layer defining an inner passage, the at least one inner layer configured to at least partially surround the member; and
an outer member defining an interior region, wherein the at least one inner layer is configured to be positioned within the interior region of the outer member;
wherein the outer member by itself is configured to resist heat exceeding 2000 degrees F.

2. The system of claim 1, wherein the system is sized and configured to provide a clearance between the system and the member once installed to permit the member to pass through the inner passage and move relative to the at least one inner layer.

3. The system of claim 1, wherein the at least one inner layer comprises a ceramic, and wherein the outer member comprises a silica.

4. The system of claim 1, wherein the at least one inner layer comprises a ceramic.

5. The system of claim 1, wherein the at least one inner layer comprises a ceramic wool.

6. The system of claim 1, wherein the at least one inner layer comprises a ceramic foam.

7. The system of claim 1, wherein the at least one inner layer comprises a ceramic fabric.

8. The system of claim 1, wherein the outer member comprises a silica or a silicon material.

9. The system of claim 1, further comprising an exterior member positioned along the outside of the outer member.

10. The system of claim 9, wherein the exterior member comprises a shell or a pipe.

11. The system of claim 9, wherein the exterior member comprises a metal or an alloy.

12. The system of claim 9, wherein the exterior member comprises a thermoplastic.

13. The system of claim 9, wherein the exterior member comprises two hemispherically-shaped shell portions that are configured to be connected to one another.

14. A system for protecting a component, comprising:
a first member defining an inner passage, the first member configured to at least partially surround the component; and
a second member surrounding the first member;
wherein the second member by itself is configured to resist heat exceeding 2000 degrees F.

15. The system of claim 14, wherein the second member is configured to protect the first member against heat and fire.

16. The system of claim 14, wherein the system is sized and configured to provide a clearance between the system and the component once the system is installed, thereby permitting the component to pass through the inner passage and move relative to the first member.

17. The system of claim 14, wherein the first member comprises a ceramic.

18. The system of claim 14, wherein the second member comprises a silica or a silicon material.

19. The system of claim 14, further comprising an exterior member positioned along the outside of the outer member.

20. The system of claim 19, wherein the exterior member comprises a shell or a pipe, the shell or pipe comprising a metal or a thermoplastic.

* * * * *